(12) United States Patent
Hao et al.

(10) Patent No.: US 12,438,807 B2
(45) Date of Patent: Oct. 7, 2025

(54) ROUTE PROCESSING METHOD AND RELATED DEVICE

(71) Applicant: Huawei Technologies Co., Ltd., Shenzhen (CN)

(72) Inventors: Weiguo Hao, Nanjing (CN); Haibo Wang, Beijing (CN); Xingjian He, Nanjing (CN); Gang Yan, Beijing (CN); Liangchuan Gao, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 389 days.

(21) Appl. No.: 18/066,625

(22) Filed: Dec. 15, 2022

(65) Prior Publication Data

US 2023/0116548 A1  Apr. 13, 2023

Related U.S. Application Data

(63) Continuation of application No. PCT/CN2021/098243, filed on Jun. 4, 2021.

(30) Foreign Application Priority Data

Jun. 16, 2020 (CN) .......................... 202010549885.6

(51) Int. Cl.
*H04L 45/28* (2022.01)
*H04L 45/02* (2022.01)

(52) U.S. Cl.
CPC .............. *H04L 45/28* (2013.01); *H04L 45/02* (2013.01)

(58) Field of Classification Search
CPC ... H04L 41/065; H04L 45/24; H04L 12/4641; H04L 41/00; H04L 45/28; H04L 45/22; H04L 45/245

See application file for complete search history.

(56) References Cited

U.S. PATENT DOCUMENTS 9,787,573 B2 * 10/2017 Singh ..................... H04L 45/28
9,935,869 B1 * 4/2018 Shakir .................... H04L 61/58
(Continued)

FOREIGN PATENT DOCUMENTS

| CN | 103036787 A | 4/2013 |
| CN | 104283789 A | 1/2015 |

OTHER PUBLICATIONS

P. Lapukhov et al, Use of BGP for Routing in Large-Scale Data Centers, Request for Comments: 7938, Aug. 2016, total 35 pages.

*Primary Examiner* — Mahran Y Abu Roumi
(74) *Attorney, Agent, or Firm* — Slater Matsil, LLP

(57) ABSTRACT

A first network device obtains first information. The first information indicates that a first link is faulty, and the first link is a link between any two network devices in a network system to which the first network device belongs. The first network device sends the first information to a second network device by using BGP, for example, sends a link fault message to the second network device by using BGP. The link fault message carries the first information. The second network device is a neighbor device of the first network device. The first network device determines an unreachable route in a routing table of the first network device based on the first information and a topology of the network system. A path corresponding to the unreachable route includes the first link. The first network device marks the unreachable route as invalid.

20 Claims, 7 Drawing Sheets spine: spine switch  AGG: aggregator switch  TOR: top-of-rack switch  POD: point of delivery  Server: server

(56) References Cited

U.S. PATENT DOCUMENTS

2006/0233181 A1   10/2006  Raszuk et al.
2016/0191374 A1*  6/2016  Singh ..................... H04L 45/28
                                                      370/228
2018/0227212 A1*  8/2018  Ferguson ............. H04L 45/033
2019/0253338 A1*  8/2019  Ferguson ............. H04L 47/125

* cited by examiner

ROUTE PROCESSING METHOD AND RELATED DEVICE

CROSS-REFERENCE TO RELATED APPLICATIONS

This application is a continuation of International Application No. PCT/CN2021/098243, filed on Jun. 4, 2021, which claims priority to Chinese Patent Application No. 202010549885.6, filed on Jun. 16, 2020. The disclosures of the aforementioned applications are hereby incorporated by reference in their entireties.

TECHNICAL FIELD

This application relates to the field of communications technologies, and in particular, to a route processing method and a related device.

BACKGROUND

Currently, in some large-scale data centers, a used routing protocol is usually the border gateway protocol (BGP) for hop-by-hop direct connection, that is, BGP for hop-by-hop direct connection is run between network devices in the data centers. When a BGP route is propagated between network devices, the network devices change a next hop of the BGP route hop by hop.

In a data center running BGP, each network device advertises only a local best route to a neighbor device of the network device. When a link fault occurs in a network, an affected network device first performs local best route calculation. If it is determined, after the local best route calculation, that no local backup path to a destination route prefix exists, the network device sends a route withdrawal message to the neighbor device. The neighbor device that receives the route withdrawal message also performs local best route calculation, and sends a route withdrawal message to another neighbor device when determining that no local backup path to the destination route prefix exists.

In other words, when a link fault occurs in the network, the network devices on a fault transfer path perform route convergence in serial. Consequently, route convergence time of the entire network is relatively long.

SUMMARY

This application provides a route processing method and a network device. After obtaining link fault information, a network device sends, to a neighbor device, the information indicating that a link is faulty, to spread a link fault message over an entire network. In addition, each network device that receives the link fault information independently calculates an unreachable route, and processes the unreachable route. In other words, network devices in the entire network can perform route convergence in parallel. This reduces routing convergence time.

A first aspect of this application provides a route processing method. A first network device obtains first information. The first information indicates that a first link is faulty, and the first link is a link between any two network devices in a network system to which the first network device belongs. The first network device sends the first information to a second network device, for example, sends a link fault message to the second network device. The link fault message carries the first information. The second network device is a neighbor device of the first network device. The first network device determines an unreachable route in a routing table of the first network device based on the first information and a topology of the network system. A path corresponding to the unreachable route includes the first link. The topology of the network system may be obtained by the first network device in advance.

That the first link is faulty, indicated by the first information, may mean that a link between any two network devices in the network system is faulty, for example, a physical line connected between the two network devices is broken. That the first link is faulty may alternatively mean that a link between any network device in the network system and another network device is interrupted because the network device in the network system is faulty.

In this application, after a network device obtains link fault information, the network device sends, to a neighbor device, the information indicating that a link is faulty, to spread a link fault message over an entire network. Each network device that receives the link fault information may independently calculate an unreachable route, and may further process the unreachable route. In other words, network devices in the entire network can perform route convergence in parallel. This reduces routing convergence time.

Optionally, the method further includes the following. The first network device receives second information from a neighbor device. The second information includes an identifier of a third network device and information about a link between the third network device and a neighbor device of the third network device. The third network device is any network device other than the first network device in the network system. The first network device forwards the second information to a remaining neighbor device of the first network device. The first network device generates the topology of the network system based on the second information.

The network system to which the first network device belongs includes network devices and a link (link) between the network devices, and BGP may be run between two network devices in the network system based on each link. Each network device in the network system may advertise, in the network, node information of the network device and information about a link between the network device and another network device, so that the network devices in the network system may form the entire network topology based on the node information and the link information.

In this application, the network device receives information advertised by another network device in the network system, to obtain node information and link information corresponding to each network device. This ensures that each network device in the network system can generate the topology of the network system based on the received node information and link information, ensures that each network device can independently calculate an unreachable route based on the link fault information, and improves flexibility of implementing the solution.

Optionally, the identifier of the third network device includes a loopback interface address of the third network device. The loopback interface address may be an Internet Protocol version 4 (IPv4) address or an IPv6 address. The link information includes an interface address of the third network device and an interface address of a neighbor device of the third network device.

In this application, a loopback interface address of a network device is used as identifier information of the network device, and interface addresses of two connected network devices are used as link information. This ensures that the network device can generate a correct network topology based on the received identifier information and link information, and improves feasibility of the solution.

Optionally, that the first network device determines an unreachable route in the routing table of the first network device based on the first information and a topology of the network system includes: When the first network device is a first end device of the first link, the first network device determines that a route that includes the first link and that is advertised by a second end device of the first link is the unreachable route; or when the first network device is not an end device of the first link, the first network device determines, based on the first information, information about a neighbor device that sends the first information, and the topology of the network system, an unreachable network device of the neighbor device, and determines that a route that is generated by the unreachable network device and received by the neighbor device is the unreachable route. The route generated by the unreachable network device is a route advertised by the unreachable network device when the unreachable network device serves as a route originating device, that is, an advertising source of the route is the unreachable network device.

It may be understood that, when the first network device is the first end device of the first link, after the first network device senses that the first link is faulty, the first network device may determine that a route advertised by a peer device of the first link is an unreachable route. When the first network device is not an end device of the first link, the first network device receives, from a neighbor device of the first network device, the first information indicating that the first link is faulty. Therefore, the first network device may determine, based on the topology of the network system, an unreachable network device of the neighbor device, that is, determine a specific network device that is reached by the neighbor device and that corresponds to a path including the first link, and then determine that the route that is generated by the unreachable network device and received by the neighbor device is the unreachable route.

In this application, the network device determines the unreachable route in two different manners based on whether the network device is an end device of a faulty link or is not an end device of a faulty link. This ensures that the network device can correctly determine an unreachable route in different scenarios, and improves feasibility of the solution.

Optionally, after the first network device determines that the route that includes the first link and that is advertised by the second end device of the first link is the unreachable route, the method further includes: The first network device sends third information to a neighbor device of the first network device. The third information is used to indicate the neighbor device of the first network device to withdraw the route that includes the first link and that is advertised by the second end device of the first link. Specifically, when the first network device is the first end device of the first link, and no backup path between the first network device and the second end device of the first link exists, a link between the first network device and the second end device of the first link is interrupted, and after performing best route calculation, the first network device may find that no backup path to the second end device of the first link exists. Therefore, the first network device may send a route withdraw message to a neighbor device of the first network device. The route withdraw message includes the foregoing third information, to indicate the neighbor device of the first network device to withdraw the route that includes the first link and that is advertised by the second end device of the first link.

In this application, after performing best route calculation based on information of the faulty link, the network device may send a route withdrawal message to a neighbor device, so that the neighbor device can perform route convergence again based on the route withdrawal message. This improves reliability of the solution.

Optionally, that a first network device obtains first information includes: The first network device obtains the first information by detecting a status of the first link or a status of an interface corresponding to the first link. Alternatively, the first network device obtains the first information from a fourth network device. The fourth network device is a neighbor device of the first network device.

In this application, the network device may autonomously detect a status of a link or a status of an interface corresponding to the link, or receive link fault information spread by a neighbor device, to obtain the link fault information. This ensures that the network device in the network system can successfully obtain the link fault information, and improves reliability of the solution.

Optionally, the method further includes: The first network device receives fourth information from the fourth network device. The first network device deletes the unreachable route from the routing table based on the fourth information. The fourth network device is a neighbor device of the first network device. Optionally, the fourth information is carried in the route withdrawal message. The fourth information is used to indicate the first network device to withdraw the route advertised by the end device of the first link. In other words, when the first network device is not the end device of the first link, the first network device may receive a route withdrawal message from a neighbor device, and when the first network device performs best route calculation based on the route withdrawal message and determines that no local backup path corresponding to the unreachable route exists, the first network device deletes the unreachable route from the routing table.

In this application, the network device may perform best route calculation based on the route withdrawal message sent by the neighbor device, and delete the unreachable route from the routing table based on a best route calculation result. This effectively implements route convergence and improves route forwarding reliability of the network device.

Optionally, the first network device sends the first information to the second network device by using an extended border gateway protocol (BGP).

In this application, the network device implements spreading of the link fault information by using BGP. This ensures that the link fault information can be effectively and rapidly spread in the network system, and improves reliability of the solution.

Optionally, after determining the unreachable route in the routing table, the first network device further processes the unreachable route, for example, deletes the unreachable route or marks the unreachable route as invalid.

A second aspect of this application provides a network device. The network device is a first network device and includes functional modules that perform the route processing method according to the first aspect or any possible design of the first aspect. Division into the functional modules is not limited in this application. The functional modules may be correspondingly divided according to procedure steps of the route processing method in the first aspect, or the functional modules may be divided according to a specific implementation requirement.

A third aspect of this application provides a network device. The network device includes a processor and a memory. The memory is configured to store instructions. The processor is configured to execute the instructions in the memory, so that the network device performs the route processing method according to the first aspect or any possible design of the first aspect.

A fourth aspect of this application provides a computer storage medium. The computer storage medium may be nonvolatile. The computer storage medium stores computer-readable instructions. When the computer-readable instructions are executed by a processor, the route processing method according to the first aspect or any possible design of the first aspect can be implemented.

A fifth aspect of this application provides a computer program product including instructions. When the computer program product runs on a computer, the computer is enabled to perform the routing processing method according to the first aspect or any possible design of the first aspect.

Implementations of this application may be combined with each other when no conflict occurs.

It can be learned from the foregoing technical solutions that embodiments of this application have the following advantages.

This application provides the routing processing method. After obtaining the link fault information, the network device sends, to the neighbor device, the information indicating that a link is faulty, to spread the link fault message over the entire network. Each network device that receives the link fault information may independently calculate the unreachable route, and delete the unreachable route or set the unreachable route as invalid. In other words, the network devices in the entire network may perform route convergence in parallel. This reduces route convergence time.

DETAILED DESCRIPTION OF ILLUSTRATIVE EMBODIMENTS

To make the objectives, technical solutions, and advantages of this application clearer and more comprehensible, the following describes embodiments of this application with reference to the accompanying drawings. It is clearly that described embodiments are merely some but not all of embodiments of this application. A person of ordinary skill in the art may learn that, as a new application scenario emerges, the technical solutions provided in embodiments of this application are also applicable to a similar technical problem.

In the specification, claims, and the accompanying drawings of this application, the terms "first", "second", and the like are intended to distinguish similar objects but do not necessarily indicate a specific order or sequence. It should be understood that the descriptions termed in such a manner are interchangeable in proper cases so that embodiments can be implemented in another order than the order illustrated or described in this application. Moreover, the terms "include", "have" and any other variants thereof are intended to cover the non-exclusive inclusion, for example, a process, method, system, product, or device that includes a series of steps or modules is not necessarily limited to those expressly listed steps or modules, but may include other steps or modules that are not expressly listed or inherent to such a process, method, product, or device. Names or numbers of steps in this application do not mean that the steps in the method procedure need to be performed in a time/logical sequence indicated by the names or numbers. An execution order of the steps in the procedure that have been named or numbered can be changed based on a technical objective to be achieved, provided that same or similar technical effects can be achieved. Division into units in this application is logical division and may be other division in actual application. For example, a plurality of units may be combined or integrated into another system, or some features may be ignored or not performed. In addition, the displayed or discussed mutual couplings or direct couplings or communication connections may be implemented through some interfaces. The indirect couplings or communication connections between the units may be implemented in electronic or other similar forms. This is not limited in this application. In addition, units or subunits described as separate parts may or may not be physically separate, may or may not be physical units, or may be distributed into a plurality of circuit units. Some or all of the units may be selected according to actual requirements to achieve the objectives of the solutions of this application.

Figure 1:
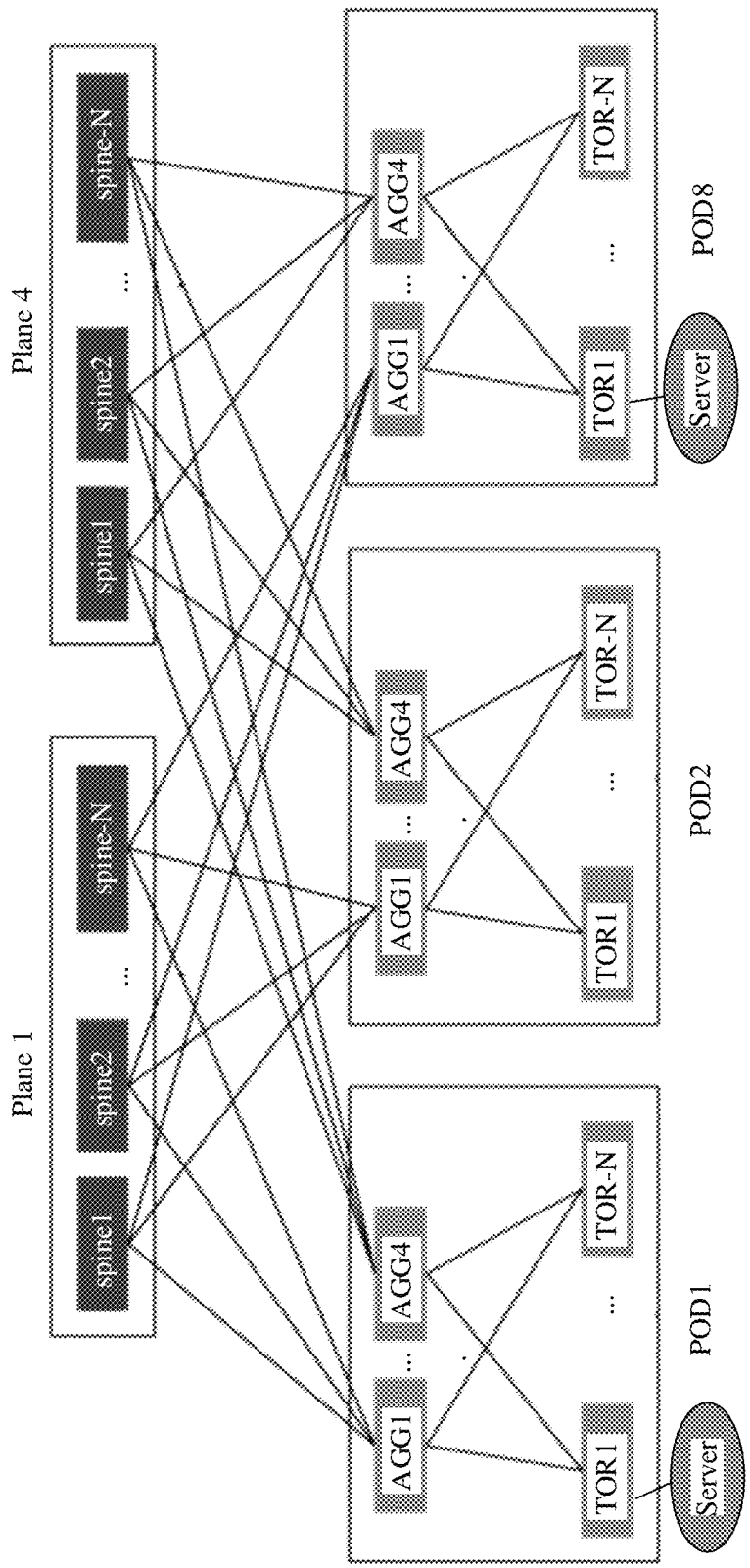
FIG. 1 is a schematic diagram of a network architecture according to an embodiment of this application.

Currently, in a large-scale data center, to implement non-blocking traffic forwarding, a CLOS network architecture is usually used for networking. The CLOS network architecture is a multi-stage switching network architecture. Usually, a topology of the CLOS network architecture does not exceed three tiers or five stages (5 stages) because a large quantity of interconnection links are required between every two tiers of network devices. The entire data center uses a three-tier networking manner, that is, each network device in an entire network runs a routing protocol, and an equal-cost multi-path (ECMP) link is formed between network devices by using a three-tier routing protocol. ECMP is a load balancing mechanism of the CLOS network architecture. A network device can implement traffic load balancing by using all network devices that are directly connected to the network device. In other words, load balancing of data packets may be implemented between different ECMP links, so that link bandwidth in the CLOS network architecture is fully utilized. For the large-scale data center, the used routing protocol is usually an external border gateway protocol (BGP) for hop-by-hop direct connection, that is, BGP for hop-by-hop direct connection is run between network devices in the data center. When a BGP route is propagated between network devices, the network devices change a next hop of the BGP route hop by hop. Specifically, refer to FIG. 1. FIG. 1 is a schematic diagram of a network architecture according to an embodiment of this application. As shown in FIG. 1, the network architecture is divided into three tiers. A top-of-rack (TOR) switch at a bottom tier is connected to a server, the TOR switch is further connected to an aggregator (AGG) switch at a middle tier, and the AGG is connected to a spine switch at a core tier. A BGP protocol may be run on each interconnection link between network devices at different tiers, and a source Internet Protocol (IP) address of a BGP session is a link interface IP address rather than a loopback interface address of the network device.

BGP is a distance-vector (DV) protocol. A network device running BGP advertises only a calculated best route (best path) to a neighbor device of the network device. When a link fault occurs in a network, an affected network device first performs best route calculation. If it is determined, after the best route calculation, that no backup path to a destination route prefix exists in the network device, the network device sends a route withdrawal message to the neighbor device. The neighbor device that receives the route withdrawal message also performs best route calculation, and sends a route withdrawal message to another neighbor device when determining that no backup path to the destination route prefix exists. In some extreme cases, the route withdrawal message may even need to be transmitted to all network devices in the entire network.

The network device sends the route withdrawal message to the another neighbor device only after the best route calculation is completed and the network device determines that no backup path to the destination route prefix exists in the network device, so that the neighbor device continues to perform the best route calculation based on the route withdrawal message. In a large-scale data center with a complex network topology, a process in which a network device performs best route calculation is relatively time-consuming. In addition, because a route withdrawal message needs to be propagated hop by hop, if a quantity of BGP hops on a transmission path is large, the network device needs to perform best route calculation at each BGP hop. In this case, it takes a long time to complete route withdrawal message processing in the entire network, that is, route convergence time of the entire network is long.

In view of this, an embodiment of this application provides a routing processing method. After obtaining link fault information, a network device sends, to a neighbor device, the information indicating that a link is faulty, to spread a link fault message over an entire network. Each network device that receives the link fault information independently calculates an unreachable route, and deletes the unreachable route or sets the unreachable route as invalid. In other words, network devices in the entire network may perform route convergence in parallel. This reduces route convergence time.

Figure 2:
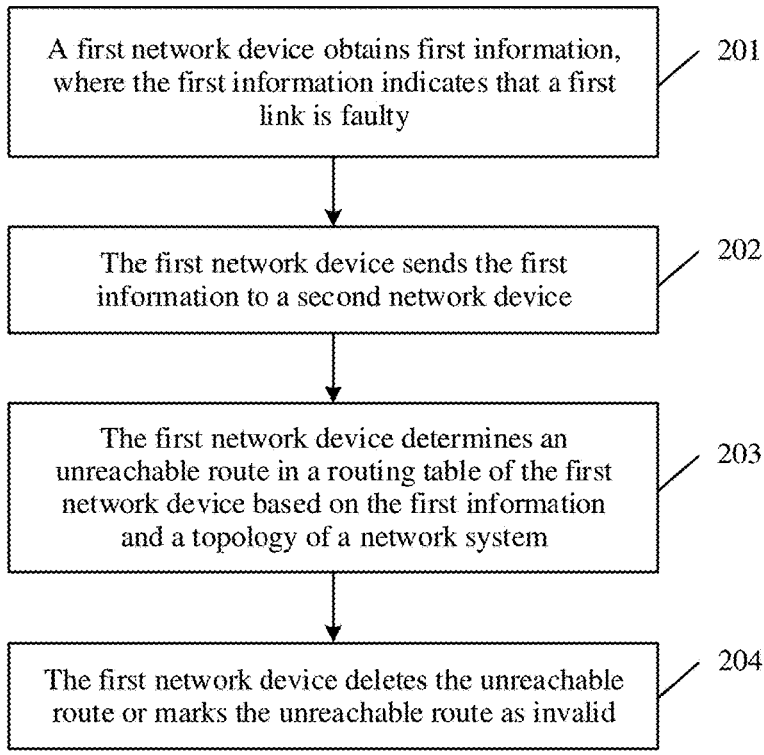
FIG. 2 is a schematic flowchart of a route processing method 200 according to an embodiment of this application.

FIG. 2 is a schematic flowchart of a route processing method 200 according to an embodiment of this application.

In step 201, a first network device obtains first information. The first information indicates that a first link is faulty, and the first link is a link between any two network devices in a network system to which the first network device belongs.

In this embodiment, the first network device may be any network device that runs BGP in a data center, and the first network device may be, for example, a spine switch, a leaf switch, an AGG, or a TOR switch in the data center. The network system to which the first network device belongs may be a network system running BGP, and the network system includes network devices in the data center to which the first network device belongs. The data center to which the first network device belongs may use a CLOS architecture for networking, for example, use a three-tier networking manner for networking, and each network device in a network runs BGP, to constitute the foregoing network system.

It should be noted that, in this embodiment, that the first link is faulty, indicated by the first information, may mean that a link between any two network devices in the network system is faulty, for example, a physical line connected between the two network devices is broken. That the first link is faulty may alternatively mean that a link between any network device in the network system and another network device is interrupted because the network device in the network system is faulty. For example, because a network device 1 is faulty, a network device 2 connected to the network device 1 cannot establish a communication connection to the network device 1, that is, a link between the network device 1 and the network device 2 is broken. In other words, interruption of a link between two network devices caused by a fault of any one of network devices at two ends of the link or a fault of the link may be referred to as a link fault.

In an optional embodiment, the first network device may obtain the first information in a plurality of manners.

Manner 1:

The first network device is an end device of the first link, and the first network device obtains the first information by detecting a status of the first link or a status of an interface corresponding to the first link.

In a possible implementation, that the first network device obtains the first information by detecting a status of the first link may specifically include: The first network device detects, by using a bidirectional forwarding detection (BFD) technology, whether the first link is faulty. BFD specifically implements link status detection by establishing a BFD session between two end devices of a link. After the BFD session is established, the first network device may periodically send a BFD packet to the other end device of the first link. If the first network device does not receive, within a detection time period, a BFD packet replied by the other end device of the first link, it may be considered that the first link is faulty, that is, the first network device obtains the first information.

In another possible implementation, that the first network device obtains the first information by detecting a status of an interface corresponding to the first link may specifically include: The first network device determines, by sensing whether an optical fiber signal of a local interface corresponding to the first link is lost, whether the first link is faulty. If the first network device senses that the optical fiber signal of the local interface (namely, an interface connecting the first network device and the other end device of the first link) corresponding to the first link is lost, it may be considered that the first link is faulty, that is, the first network device obtains the first information.

Manner 2:

The first network device is not an end device of the first link, and the first network device receives the first information from a fourth network device. The fourth network device is a neighbor device of the first network device.

In this embodiment, in the network system to which the first network device belongs, after sensing that the first link is faulty, any end device of the first link may send a link fault message to a neighbor device connected to the end device, to indicate that the first link is faulty; and after receiving the link fault message, the neighbor device continues to forward the link fault message to another neighbor device connected to the neighbor device, to spread the link fault message in the network system. In other words, when the first network device is not an end device of the first link, the first network device may receive a link fault message from any neighbor device (namely, the fourth network device) of the first network device. The link fault message carries the first information. For example, the network device in the network system may advertise and propagate the link fault message by using BGP. A load part of the link fault message carries the first information, and the first information carries identifiers of the two end devices of the first link. The first network device that receives the link fault message may determine the faulty first link based on the identifiers of the end devices carried in the first information.

In step 202, the first network device sends the first information to a second network device. The second network device is a neighbor device of the first network device.

When the first network device is the end device of the first link, after the first network device senses that the first link is faulty, the first network device may generate the link fault message and send the link fault message to a neighbor device (namely, the second network device) of the first network device. The load part of the link fault message carries the first information, and the first information includes an identifier of the first network device and an identifier of the other end device of the first link, to indicate the faulty first link. The second network device may be all neighbor devices connected to the first network device. To be specific, after the first network device senses that the first link is faulty, the first network device sends the link fault message to all neighbor devices connected to the first network device.

When the first network device is not the end device of the first link, after the first network device receives the link fault message from the fourth network device, the first network device parses the received link fault message, to determine that the link fault message is a message indicating that the first link is faulty. After determining that the received message is the link fault message, the first network device may send the link fault message to a neighbor device other than the fourth network device. In other words, the second network device may be specifically a device other than the fourth network device in all neighbor devices of the first network device.

The first network device may send the first information to the second network device by using BGP. Optionally, the first network device may also use another routing protocol, for example, a routing information protocol (RIP) or intermediate system to intermediate system (IS-IS).

In step 203, the first network device determines an unreachable route in a routing table of the first network device based on the first information and a topology of the network system. A path corresponding to the unreachable route includes the first link.

In this embodiment, after obtaining the first information, the first network device may determine, based on the topology of the network system, a path including the first link, to further determine that a route corresponding to the path including the first link is the unreachable route in the routing table. The first network device may obtain the topology of the network system in advance. The topology of the network system includes connection relationships between all network devices in the network system. The first network device may determine, based on the connection relationships between the network devices in the network system, a path to any network device.

In other words, the first network device may calculate, based on the topology of the network system, whether the path to any network device includes the first link. If the first network device learns, through calculation based on the topology of the network system, that one or more paths each to a network device include the first link, the first network device may determine that a route corresponding to the one or more paths is an unreachable route. If the first network device learns, through calculation based on the topology of the network system, that each path to a network device includes the first link, the first network device may determine that all routes to the network device are unreachable routes.

It should be noted that there is no fixed sequence between step 202 and step 203. After obtaining the first information, the first network device may perform step 202 and step 203 in parallel. When processing resources of the first network device are limited, the first network device may alternatively first perform step 202.

In step 204, the first network device deletes the unreachable route or mark the unreachable route as invalid.

Optionally, the routing table may be at least one of a route information base (RIB) and a forwarding information base (FIB).

In this embodiment, after the first network device determines the unreachable route in the routing table, the first network device may mark the unreachable route in the routing table as invalid by adding a mark of invalidity to the unreachable route in the routing table.

In a possible embodiment, when the first network device is not the end device of the first link, the first network device may mark an unreachable route in the routing information base as invalid, and the first network device deletes an unreachable route in the local forwarding information base or deletes an outbound interface of a BGP neighbor corresponding to the unreachable route. The first network device deletes an unreachable route from the RIB after receiving a route withdrawal message that indicates to withdraw the unreachable route.

When the first network device is the end device of the first link, the first network device may also mark an unreachable route in the RIB as invalid, and delete an unreachable route in the FIB. Because the first network device is a device that senses that the first link is faulty, the first network device may directly delete, without deleting the unreachable route in the RIB based on the route withdraw message, the unreachable route in the RIB after marking the unreachable route in the RIB as invalid.

In this embodiment, after obtaining link fault information, a network device sends, to a neighbor device of the network device, the information indicating that a link is faulty, to spread a link fault message over an entire network. Each network device that receives the link fault information may independently calculate an unreachable route, and delete the unreachable route or set the unreachable route as invalid. In other words, network devices in the entire network may perform route convergence in parallel, and do not need to perform route convergence after receiving a route withdrawal message sent by an upper-stage neighbor device. This reduces route convergence time.

Optionally, in a possible embodiment, when a network device in the network system advertises a route in the network, the network device may carry an identifier of the network device to the advertised route, that is, an originating device (hereinafter referred to as a route originating device) that advertises a route carries an identifier of the originating device to the route advertised by the originating device. Specifically, the route originating device may carry an originator attribute to the advertised route. The originator attribute includes the identifier of the route originating device, and the identifier of the route originating device may be a node identifier, for example, may be a loopback interface address of the route originating device. For example, the network device in the network system may import routes of different protocol types to BGP, for example, import an external route such as a static route, a direct route, or an open shortest path first (OSPF) route, carry an originator attribute of a loopback of the network device to the imported route, and then advertise the route to a neighbor device of the network device, so that the route advertised by the network device can be spread in the network system. That is, the first network device in the network system may receive a route that is sent by a neighbor device and that carries the identifier of the route originating device, and the first network device may determine, based on the identifier of the route originating device carried in the received route, the originating device that advertises the route.

For ease of understanding, the following describes, in detail with reference to a specific example, a process in which a network device in a network system advertises a route.

Figure 3:
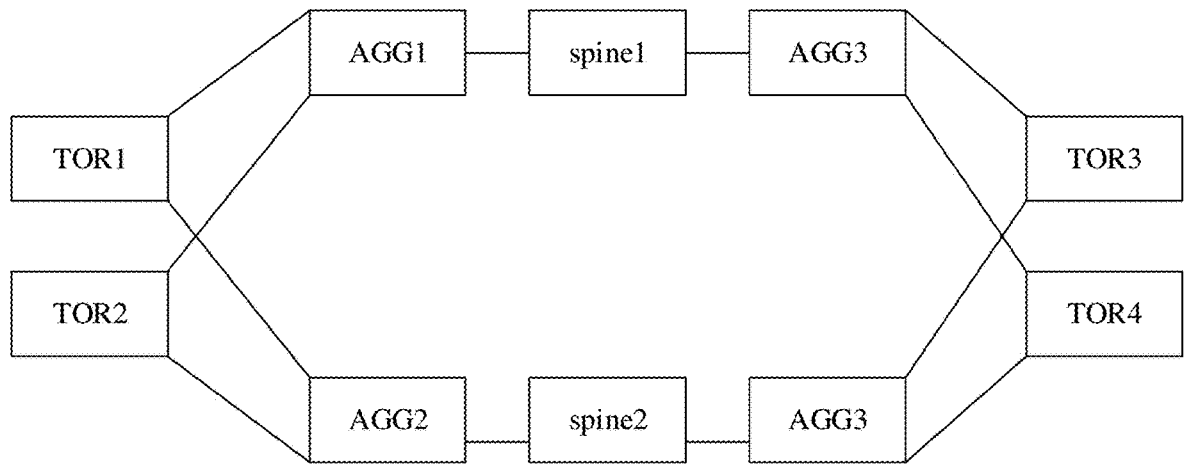
FIG. 3 is a schematic diagram of a network topology according to an embodiment of this application.

FIG. 3 is a schematic diagram of a network topology according to an embodiment of this application. It should be noted that, for ease of description, a TOR switch 1 and a TOR switch 2 are referred to as TOR1 and TOR2 for short below, and a spine switch 1 and a spine switch 2 are referred to as spine1 and spine2 for short below.

As shown in FIG. 3, both TOR1 and TOR2 are connected to AGG1 and AGG2, AGG1 is connected to AGG3 by using spine1, AGG3 is further connected to TOR3 and TOR4, AGG2 is connected to AGG4 by using spine2, and AGG4 is further connected to TOR3 and TOR4.

Assuming that a loopback interface address of TOR1 is 1.1.1.1/32, the loopback interface address 1.1.1.1/32 is also a node identifier of TOR1. TOR1 has two local direct routes: 100.1.1.1/24 and 101.1.1.1/24. 100.1.1.1/24 and 101.1.1.1/24 are IP address prefixes of the two direct routes, respectively. TOR1 imports the two direct routes to BGP and advertises the routes to AGG1 and AGG2 by using BGP. A next hop of the route advertised to AGG1 is 10.1.1.1 (10.1.1.1 is an address of a TOR1 interface connected to AGG1), and a next hop of the route advertised to AGG2 is 11.1.1.1 (11.1.1.1 is an address of a TOR1 interface connected to AGG2). Each of the routes advertised to AGG1 and AGG2 carries an originator attribute. The originator attribute includes 1.1.1.1 (namely, a loopback address of TOR1). After receiving the routes advertised by TOR1, AGG1 and AGG2 generate two BGP routes to 100.1.1.1/24 and 101.1.1.1/24 in routing tables. In the routing table of AGG1, an outbound interface of the two routes is AGG1-TOR1, and the next hop is 10.1.1.1. In the routing table of AGG2, an outbound interface of the two routes is AGG2-TOR1, and the next hop is 11.1.1.1. In addition, AGG1 and AGG2 may further generate an association relationship among a route, a neighbor device, and a route originating device, that is, record routes that are learned from each neighbor device and that are advertised by the route originating devices.

After receiving the routes advertised by TOR1, AGG1 and AGG2 perform best route calculation and send the routes to other BGP neighbor devices, namely, spine1 and spine2. In addition, a next hop of the route sent by AGG1 to spine1 is changed to 30.1.1.1 (namely, an address of an AGG1 interface connected to spine1), and a next hop of the route sent by AGG2 to spine2 is changed to 31.1.1.1 (namely, an address of an AGG2 interface connected to spine2). The originator attribute carried in the route remains unchanged, namely, 1.1.1.1. Similarly, after receiving the routes, spine1 and spine2 perform best route calculation and send the routes to neighbor devices AGG3 and AGG4, respectively. After receiving the routes, AGG3 and AGG4 send the routes to TOR3 and TOR4 by using BGP. TOR3 can receive the routes 100.1.1.1/24 and 101.1.1.1/24 on both of AGG3 and AGG4. In this way, load balancing can be implemented locally, and load balancing links are TOR3-AGG3 and TOR3-AGG4. Similarly, TOR4 can also form load balancing links TOR4-AGG3 and TOR4-AGG4. Specifically, TOR3 and TOR4 may generate an association relationship among a route, a neighbor device, and a route originating device. For example, after TOR3 learns a route advertised by TOR1, an association relationship among a generated route, a neighbor device, and a route originating device is shown in the following table.

TABLE 1

| BGP neighbor | IP address prefix/mask | Originator attribute |
| --- | --- | --- |
| AGG3 | 100.1.1.1/24 | 1.1.1.1 (TOR1) |
| AGG3 | 101.1.1.1/24 | 1.1.1.1 (TOR1) |
| AGG4 | 100.1.1.1/24 | 1.1.1.1 (TOR1) |
| AGG4 | 101.1.1.1/24 | 1.1.1.1 (TOR1) |

Optionally, in a possible embodiment, in step 203, the first network device determines the unreachable route in the routing table of the first network device based on the first information and the topology of the network system in a plurality of manners. Specifically, the manners in which the first network device determines the unreachable route in the routing table of the first network device are shown as follows.

Manner 1:

When the first network device is the first end device of the first link, the first network device determines that a route that includes the first link and that is advertised by a second end device of the first link is the unreachable route. In other words, after the first network device senses that the first link is faulty, the first network device may determine that a route advertised by a peer device of the first link is the unreachable route. Therefore, the first network device may search the routing table for a route whose originator attribute is an identifier of the peer device of the first link, and delete a found route or set the found route as invalid.

Figure 4:
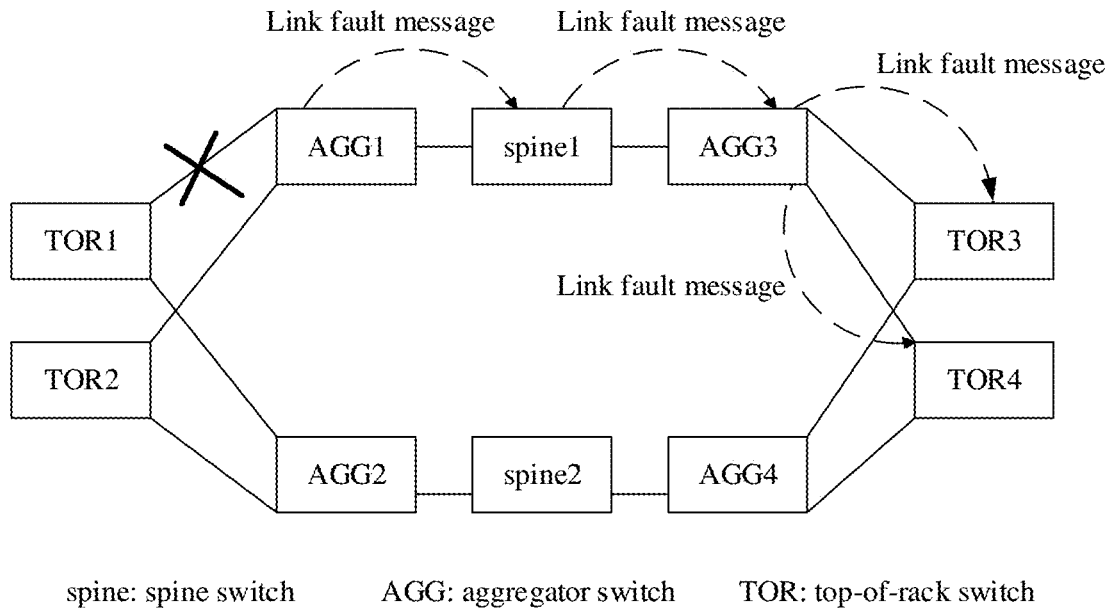
FIG. 4 is a schematic diagram of a network topology in which a link fault occurs according to an embodiment of this application.

For example, FIG. 4 is a schematic diagram of a network topology in which a link fault occurs according to an embodiment of this application. As shown in FIG. 4, according to the embodiment shown in FIG. 3, a link between TOR1 and AGG1 is faulty. After AGG1 senses a fault in a local interface connected to TOR1 or detects a fault in an AGG1-TOR1 link by using BFD, AGG1 sends a link fault message to a neighbor device (that is, spine1) of AGG1. The link fault message carries identifiers of AGG1 and TOR1, to indicate that the AGG1-TOR1 link is faulty. In addition, AGG1 may determine that the route advertised by TOR1 is an unreachable route. Therefore, AGG1 may search the routing table for a route whose originator attribute is 1.1.1.1, that is, search the routing table for a route whose originator attribute is an identifier of TOR1, and delete a found route or set the found route as invalid.

Manner 2:

When the first network device is not the end device of the first link, the first network device determines, based on the first information, information about a neighbor device that sends the first information, and the topology of the network system, an unreachable network device of the neighbor device, and determines that a route that is generated by the unreachable network device and received by the neighbor device is the unreachable route. The route generated by the unreachable network device is a route advertised by the unreachable network device when the unreachable network device serves as a route originating device, that is, an advertising source of the route is the unreachable network device.

It may be understood that, when the first network device is not the end device of the first link, the first network device receives, from the neighbor device of the first network device, the first information indicating that the first link is faulty. Therefore, the first network device may determine, based on the topology of the network system, an unreachable network device of the neighbor device, that is, determine a specific network device that is reached by the neighbor device and that corresponds to a path including the first link, and then determine that the route that is generated by the unreachable network device and received by the neighbor device is the unreachable route.

For example, the network topology shown in FIG. 4 is used as an example. Assuming that a link between TOR1 and AGG1 is faulty, AGG1 sends a link fault message to spine1 after sensing a link fault. After receiving the link fault message, spine1 sends the link fault message to another neighbor device (that is, AGG3). Similarly, after receiving the link fault message, AGG3 sends the link fault message to another neighbor device (that is, TOR3). After TOR3 receives the link fault message, TOR3 traverses, based on the network topology, a network device that cannot be reached by AGG3, and TOR3 may find that TOR1 cannot be reached by AGG3. Therefore, TOR3 may determine that a route learned from a BGP neighbor (AGG3) and generated by TOR1 is an unreachable route.

Specifically, after the TOR3 determines that the route learned from the AGG3 and generated by the TOR1 is an unreachable route, the TOR3 may find the unreachable route in the routing table based on a case in which the neighbor device is AGG3 and the route originating device is TOR1, and the foregoing association relationship (that is, the association relationship between the route, the neighbor device, and the route originating device). Table 1 is used as an example. TOR1 may determine, in RIB, that a route whose BGP neighbor is AGG3 and whose originator attribute is 1.1.1.1 is an unreachable route, and delete the unreachable route or set the unreachable route as invalid. Subsequently, after TOR3 receives a route withdrawal message sent by AGG3, a TOR switch deletes the unreachable route from RIB.

Figure 5:
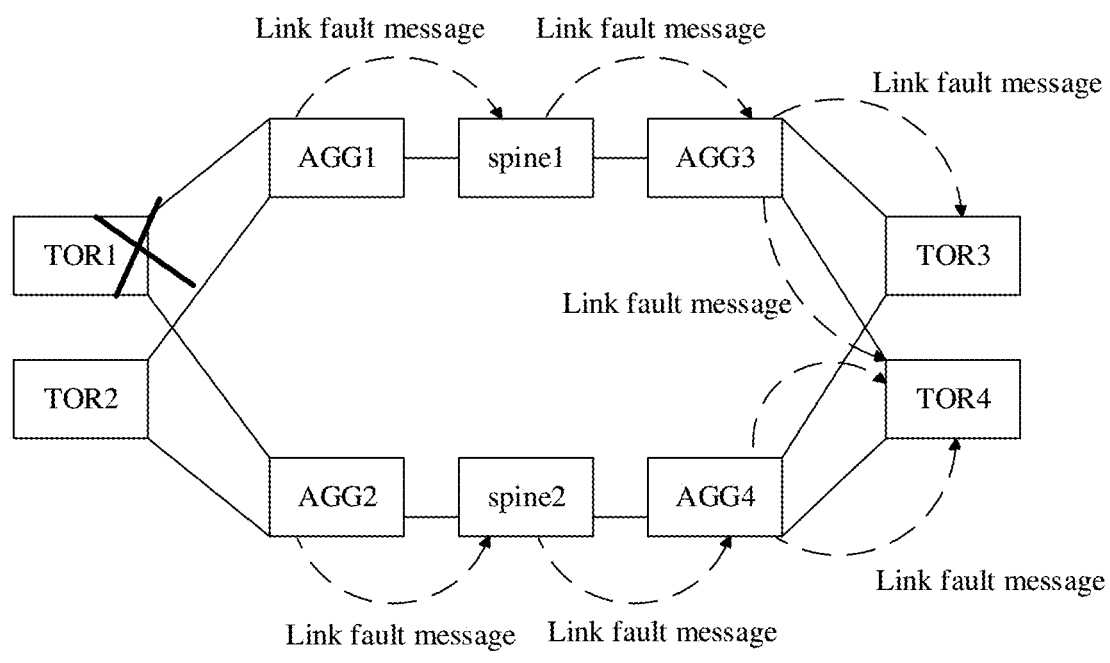
FIG. 5 is another schematic diagram of a network topology in which a link fault occurs according to an embodiment of this application.

In another possible example, FIG. 5 is a schematic diagram of a network topology in which a link fault occurs according to an embodiment of this application. As shown in FIG. 5, according to the embodiment described in FIG. 3, assuming that TOR1 is faulty, AGG1 sends a link fault message to spine1 after sensing a link fault, and AGG2 sends a link fault message to spine2 after sensing the link fault. Finally, a TOR switch may receive the link fault message from AGG3 and AGG4. Then, TOR3 traverses, based on the network topology, a network device that cannot be reached by AGG3 and AGG4. TOR3 may find that TOR1 cannot be reached by AGG3 and AGG4. Therefore, TOR3 may determine that routes learned from AGG3 and AGG4 and generated by TOR1 are unreachable routes.

Optionally, in a possible embodiment, the method 200 may further include: The first network device sends third information to a neighbor device of the first network device by using BGP. The third information is used to indicate the neighbor device of the first network device to withdraw the route that includes the first link and that is advertised by the second end device of the first link.

It may be understood that, when the first network device is the first end device of the first link, and no backup path between the first network device and the second end device of the first link exists, a link between the first network device and the second end device of the first link is interrupted, and after performing best route calculation, the first network device may find that no backup path to the second end device of the first link exists. Therefore, the first network device may send a route withdraw message to a neighbor device of the first network device by using BGP. The route withdraw message includes the foregoing third information, to indicate the neighbor device of the first network device to withdraw the route that includes the first link and that is advertised by the second end device of the first link.

FIG. 4 is used as an example. After sensing a fault of a link between AGG1 and TOR1 and performing best route calculation, AGG1 finds that no local backup path to TOR1 exists. Therefore, AGG1 may send a route withdraw message to spine1 by using BGP. After receiving a route withdrawal message sent by AGG1, spine1 performs best route calculation. After performing best route calculation, spine1 finds that no backup path to TOR1 exists. Therefore, spine1 deletes, from RIB, the route that includes the link AGG1-TOR1 and that is advertised by TOR1.

In addition, when the first network device is not the first end device of the first link, and the first network device receives a route withdrawal message sent by a neighbor device and finds, after performing best route calculation based on the route withdrawal message, that no backup path to a specific route originating device exists, the first network device may also send the route withdrawal message to a remaining neighbor device.

FIG. 4 is also used as an example. After receiving a route withdrawal message sent by AGG1 and performing best route calculation, spine1 finds that no backup path to TOR1 exists. Therefore, spine1 may send a route withdrawal message to AGG3, to indicate AGG3 to withdraw the route advertised by TOR1. Similarly, after receiving the route withdrawal message sent by spine1 and performing best route calculation, AGG3 finds that no backup path to TOR1 exists. Therefore, AGG3 may send a route withdrawal message to TOR3, to indicate TOR3 to withdraw the route advertised by TOR1.

Optionally, in a possible embodiment, the method 200 may further include: The first network device receives fourth information from a third network device. The first network device deletes the unreachable route from the routing table based on the fourth information.

The third network device is a neighbor device of the first network device. The fourth information is carried in the route withdrawal message. The fourth information is used to indicate the first network device to withdraw the route advertised by the end device of the first link. In other words, when the first network device is not the end device of the first link, the first network device may receive a route withdrawal message from a neighbor device, and when the first network device performs best route calculation based on the route withdrawal message and determines that no local backup path corresponding to the unreachable route exists, the first network device deletes the unreachable route from the routing table.

The foregoing describes in detail a procedure in which the network device performs routing processing. The following describes in detail a process in which the network device generates a network topology.

Figure 6:
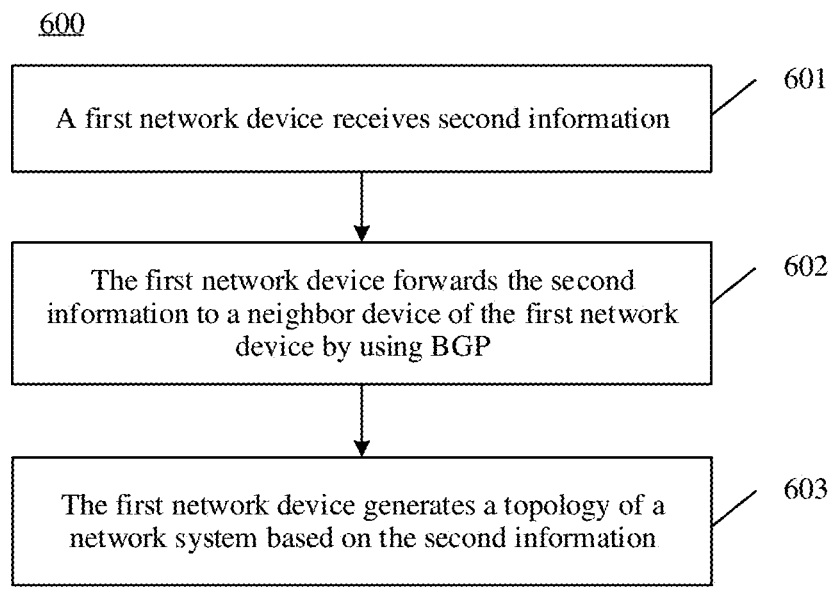
FIG. 6 is a schematic flowchart of a network topology generation method 600 according to an embodiment of this application.

FIG. 6 is a schematic flowchart of a network topology generation method 600 according to an embodiment of this application.

In step 601, a first network device receives second information. The second information includes an identifier of a network device and information about a link between the network device and a neighbor device of the network device. The network device is any network device other than the first network device in the network system. In this application, the any network device is referred to as a third network device.

In this embodiment, a network system to which the first network device belongs includes network devices and a link between the network devices, and BGP may be run between two network devices in the network system based on each link. To facilitate network devices in the network system to form an entire network topology, each network device in the network system may advertise, in a network, node information of the network device and information about a link between the network device and another network device. The node information of the network device may be specifically an identifier of the network device, and the information about the link between the network device and the another network device may be specifically information about a link between the network device and a neighbor device of the network device. In other words, in a network system, each network device may send corresponding node information and link information to a neighbor device, to spread the node information and the link information of the network device over an entire network by using the neighbor device. After receiving the node information and the link information, the neighbor device continues to forward the node information and the link information to another neighbor device, so that the node information and the link information are spread over the entire network. Therefore, the first network device may receive, from a neighbor device of the first network device, the second information (that is, the node information and the link information) advertised by another network device in the network system.

In a possible embodiment, the identifier of the network device includes a loopback interface address of the network device, that is, the identifier of the network device may be a loopback interface address of the network device, and the loopback interface address may be an IPv4 address or an IPv6 address. The link information includes an interface address of the network device and an interface address of the neighbor device of the network device, that is, the link information includes a local interface address of the network device and an interface address of a peer device of the network device. The local interface address of the network device and the interface address of the peer device may also be IPv4 addresses or IPv6 addresses.

Figure 7:
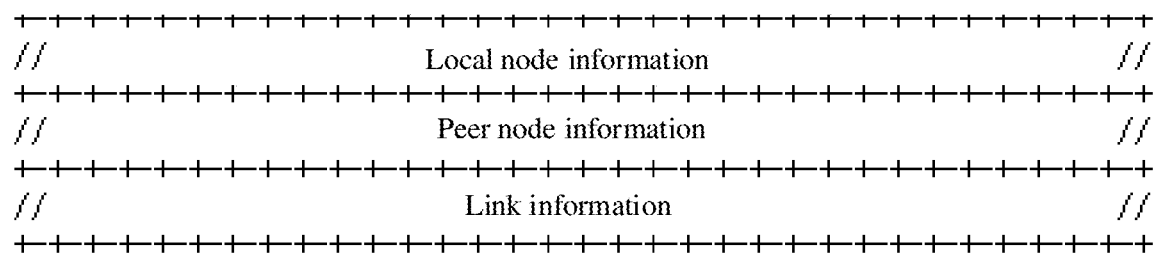
FIG. 7 is a schematic diagram of a format of link information according to an embodiment of this application.

For example, FIG. 7 is a schematic diagram of a format of link information according to an embodiment of this application. Local node information (local node descriptors) is local node information of a network device, that is, a loopback address of the network device. Peer node information (remote node descriptors) is node information of a peer device of the network device, that is, a loopback address of the peer device of the network device. Link information (link descriptors) is a local interface address of the network device and an interface address of the peer device of the network device.

In step 602, the first network device forwards the second information to the neighbor device of the first network device.

In this embodiment, after the first network device receives the second information sent by the neighbor device, the first network device may forward the second information to another neighbor device, so that the second information can be spread over the entire network.

In a possible embodiment, the first network device may also send the network device identifier of the first network device and the information about the link between the first network device and the neighbor device to the neighbor device of the first network device, so that the node information and the link information of the first network device are spread over the entire network. Optionally, the first network device forwards the second information to the neighbor device of the first network device by using BGP.

In step 603, the first network device generates the topology of the network system based on the second information.

It may be understood that, after the node information and the link information that are advertised by each network device in the network system are spread and converged in the entire network, the first network device may obtain the second information advertised by all the other network devices. The first network device may determine a connection relationship between network devices in the entire network based on the node information and the link information in the obtained second information, and therefore may generate the topology of the entire network system, so that the first network device can calculate, based on the topology of the network system, reachability from the first network device to another network device.

For ease of understanding, the following describes, in detail with reference to a specific example, a procedure in which a network device generates a network topology.

Figure 8:
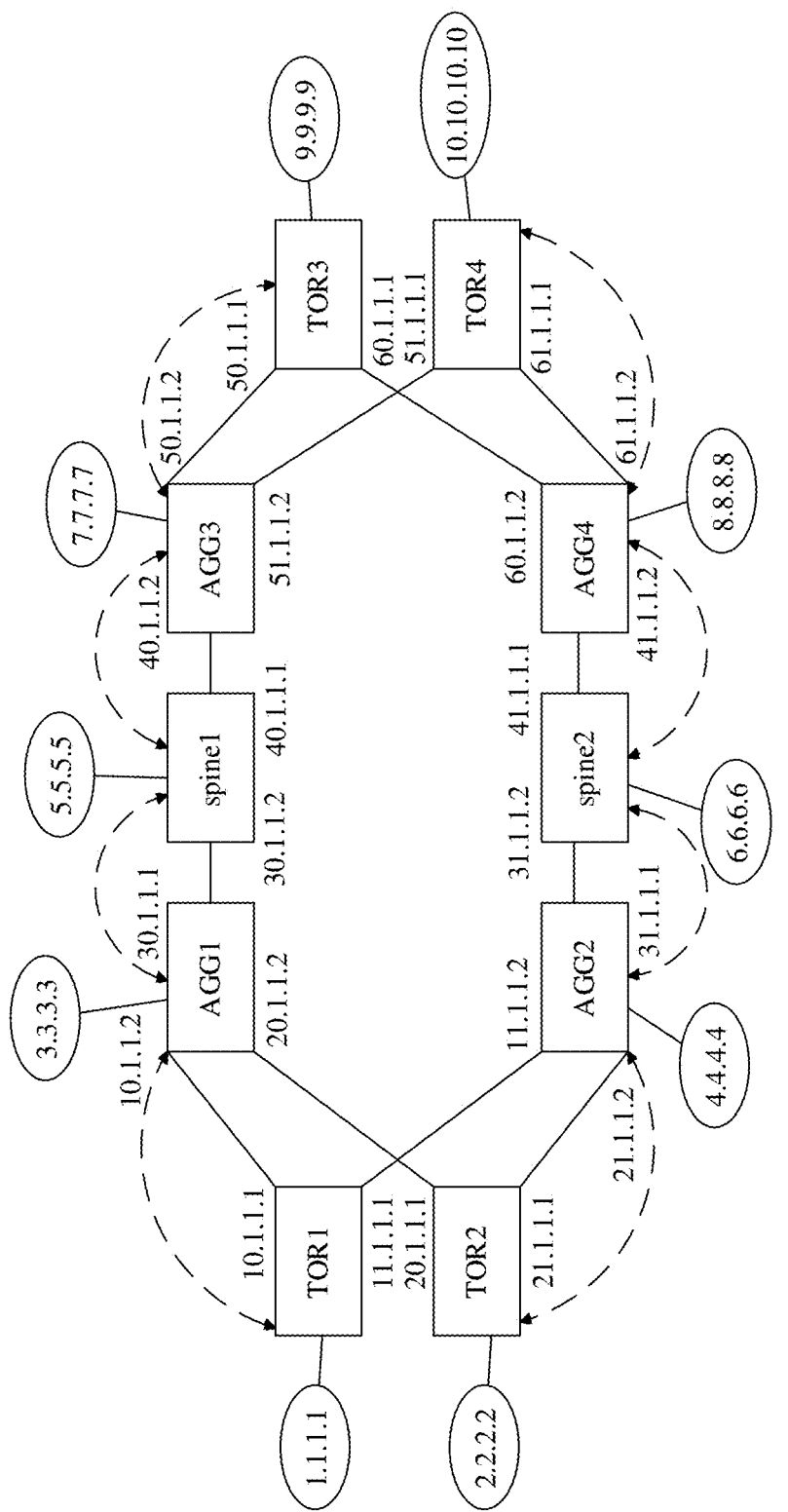
FIG. 8 is a schematic diagram of an architecture of a network system according to an embodiment of this application.

FIG. 8 is a schematic diagram of an architecture of a network system according to an embodiment of this application. As shown in FIG. 8, loopback interface addresses of TOR1, TOR2, AGG1, AGG2, spine1, spine2, AGG3, AGG4, TOR3 and TOR4 are 1.1.1.1, 2.2.2.2, 3.3.3.3, 4.4.4.4, 5.5.5.5, 6.6.6.6, 7.7.7.7, 8.8.8.8, 9.9.9.9 and 10.10.10.10, respectively. In addition, an address of an interface connecting each network device to a neighbor device is marked in FIG. 8. For example, an address of a local interface connecting TOR1 to AGG1 is 10.1.1.1, an address of a local interface connecting TOR1 to AGG2 is 11.1.1.1, an address of a local interface connecting AGG1 to TOR1 is 10.1.1.2, and an address of a local interface connecting AGG2 to TOR2 is 20.1.1.2.

Specifically, TOR1 may send, by using BGP, a loopback interface address of TOR1 and information (that is, a local interface address and an interface address of a peer device)

about links between TOR1 and AGG1 and between TOR1 and AGG2 to AGG1 and AGG2, to spread the loopback interface address and the link information over the entire network. In this way, the loopback interface address and the link information that are advertised by TOR1 can be spread to TOR3 and TOR4 through AGG1-spine1-AGG3 and AGG2-spine2-AGG4. Similarly, loopback interface addresses and link information that are advertised by TOR2, AGG1, AGG2, spine1, spine2, AGG3, and AGG4 can also be advertised to TOR3 and TOR4.

Figure 9:
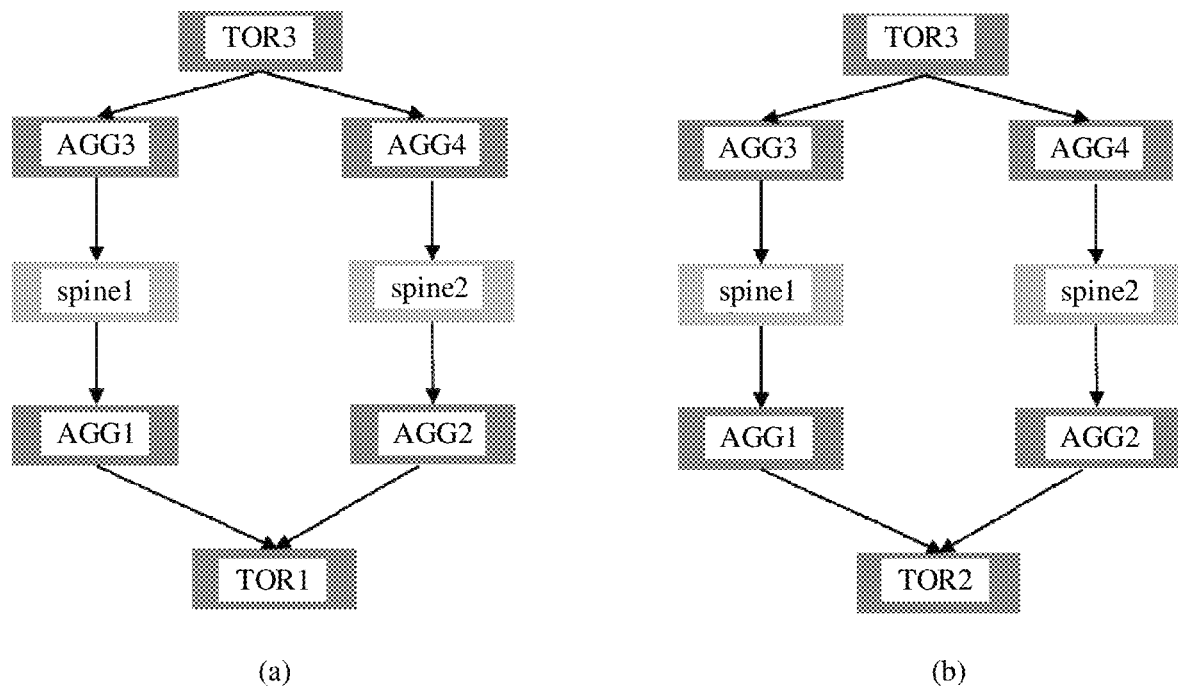
FIG. 9 is a schematic diagram of a network topology generated by a network device according to an embodiment of this application.

For TOR3 and TOR4, after receiving the node information and the link information that are advertised by another network device in a network system, TOR3 and TOR4 may generate a topology of the network system based on the received node information and link information, and may calculate, based on the generated network topology, reachability to a network device in the network system. For example, FIG. 9 is a schematic diagram of a network topology generated by a network device according to an embodiment of this application. As shown in FIG. 9, TOR3 may generate a corresponding network topology based on received node information and link information. (a) in FIG. 9 shows a network topology between TOR3 and TOR1. Based on the network topology shown in (a) in FIG. 9, TOR3 may obtain reachability to TOR1 through calculation. (b) in FIG. 9 shows a network topology between TOR3 and TOR2. Based on the network topology shown in (b) in FIG. 9, TOR3 may obtain reachability to TOR2 through calculation.

The foregoing describes the route processing method provided in embodiments of this application. For ease of understanding, the following describes in detail application of the route processing method provided in embodiments of this application in a data center based on a specific network topology of the data center.

Figure 10:
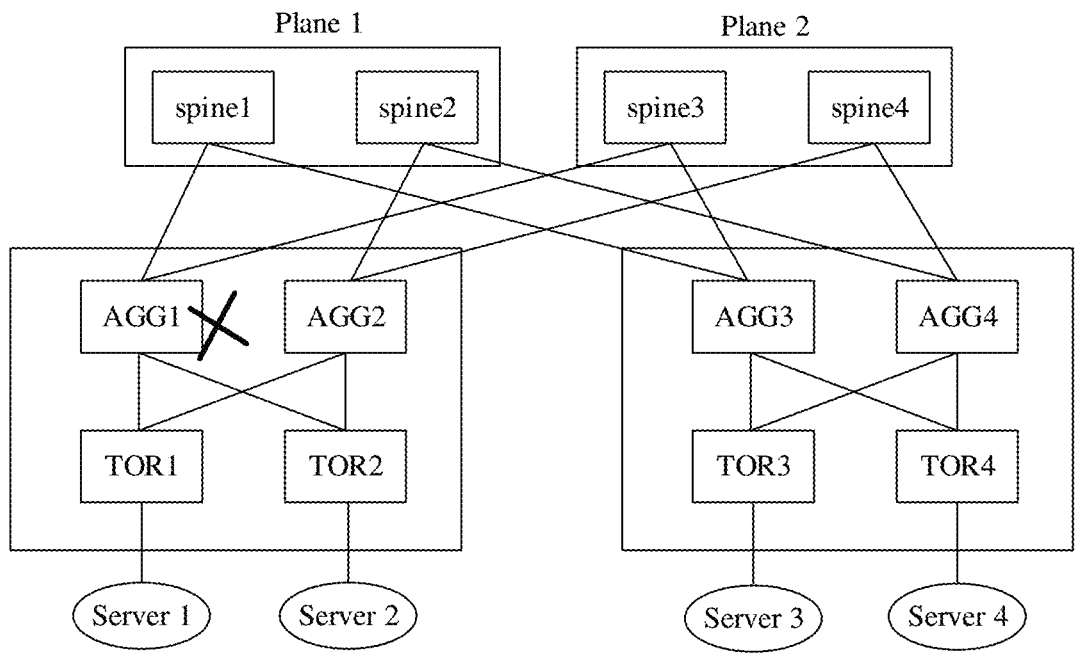
FIG. 10 is a schematic diagram of a network topology of a data center according to an embodiment of this application.

FIG. 10 is a schematic diagram of a network topology of a data center according to an embodiment of this application. As shown in FIG. 10, AGG1 and AGG2 are respectively connected to TOR1 and TOR2, AGG3 and AGG4 are respectively connected to TOR3 and TOR4, and TOR1, TOR2, TOR3, and TOR4 are respectively connected to a server 1, a server 2, a server 3, and a server 4. Both AGG1 and AGG3 are connected to spine1 on a plane 1 and spine3 on a plane 2. Both AGG2 and AGG4 are connected to spine2 on the plane 1 and spine4 on the plane 2.

Specifically, a network device in a network shown in FIG. 10 may advertise node information and corresponding link information of the network device by using BGP and spread the node information and the corresponding link information over the entire network, so that all network devices in the entire network can form an entire-network topology. In addition, TOR1, TOR2, TOR3, and TOR4 may also advertise imported routes to the entire network by using BGP, so that network devices in the entire network can learn corresponding routes.

After AGG1 is faulty, spine1 and spine3 that are connected to AGG1 may sense that the local optical fiber interfaces connected to AGG1 have no signal, that is, a link between spine1 and AGG1 and a link between spine3 and AGG1 are faulty. spine1 immediately sends a link fault message 1 to AGG3. The link fault message 1 carries a local interface address of spine1 and an interface address of AGG1, and is used to indicate that a link between spine1 and AGG1 is faulty. Similarly, spine3 immediately sends a link fault message 2 to AGG3. The link fault message 2 carries a local interface address of spine3 and an interface address of AGG1, and is used to indicate that a link between spine3 and AGG1 is faulty. After receiving the link fault message 1 and the link fault message 2, AGG3 also immediately forwards the link fault message 1 and the link fault message 2 to TOR3 and TOR4 (that is, the remaining neighbor devices of AGG3).

For spine1 and spine3, after sensing that a local optical fiber interface connected to AGG1 has no signal, in addition to sending a link fault message to AGG3, spine1 and spine3 may further perform route convergence in parallel. Specifically, spine1 and spine3 may determine, based on the network topology, that neither a backup path to TOR1 nor a backup path to TOR2 exists, that is, both TOR1 and TOR2 are unreachable network devices. Therefore, spine1 and spine3 may set routes advertised by TOR1 and TOR2 in a routing table as invalid or directly delete routes initially advertised by TOR1 and TOR2 in the routing table. After spine1 and spine3 determine that no backup path to TOR1 and TOR2 exists, or after spine1 and spine3 perform best route calculation, spine1 and spine3 may further send route withdrawal messages to AGG3, to indicate AGG3 to withdraw the routes advertised by TOR1 and TOR2.

After AGG3 receives the link fault messages sent by spine1 and spine3, in addition to forwarding the link fault messages to TOR3 and TOR4, AGG3 may also perform route convergence in parallel. Specifically, AGG3 may determine, based on the network topology, that TOR1 and TOR2 cannot be reached by spine1 and spine3, that is, TOR1 and TOR2 are network devices that cannot be reached by neither spine1 nor spine3. Therefore, AGG3 may determine that a route initially advertised by TOR1 or TOR2 and received by using spine1 or spine3 is an unreachable route, and AGG3 may set the unreachable route determined in the routing table as invalid. In addition, after AGG3 receives the route withdrawal messages sent by spine1 and spine3, AGG3 may perform best route calculation based on the route withdrawal messages, and delete, based on results of the best route calculation, the routes advertised by TOR1 and TOR3 in the routing table. After AGG3 completes best route calculation, AGG3 sends route withdrawal messages to TOR3 and TOR4 to indicate TOR3 and TOR4 to withdraw routes advertised by TOR1 and TOR2.

After receiving the link fault messages sent by AGG3, TOR3 and TOR4 may perform route convergence based on the received link fault messages. Specifically, both TOR3 and TOR4 may determine, based on the network topology, that TOR1 and TOR2 cannot be reached by AGG3, that is, TOR1 and TOR2 are network devices that cannot be reached by AGG3. Actually, TOR3 and TOR4 may further reach TOR1 and TOR2 by using AGG4. Therefore, TOR3 and TOR4 may determine that a route initially advertised by TOR1 or TOR2 and received by using AGG3 is an unreachable route, and TOR3 and TOR4 may set the unreachable route determined in the routing table as invalid. In addition, after TOR3 and TOR4 receive the route withdrawal messages sent by AGG3, TOR3 and TOR4 may perform best route calculation based on the route withdrawal messages, and delete, based on results of the best route calculation, the routes initiated advertised by TOR1 and TOR3 and received by using AGG3.

Based on the foregoing analysis, it can be learned that after spine1 and spine3 sense that the links are faulty, spine1 and spine3 immediately send the link fault messages to the neighbor device AGG3, so that AGG3 can forward the link fault messages to TOR3 and TOR4, that is, the link fault message can be quickly spread over the entire network. Because a quantity of link fault messages spread over the entire network is small, a time period for spreading the link fault message over the entire network is short. When a time period for spreading the link fault messages is ignored, and most network devices at all stages (that is, spine1, spine3, AGG3, TOR3, and TOR4) in the entire network perform route convergence in parallel, route convergence time of the entire network is greatly shortened.

Figure 11:
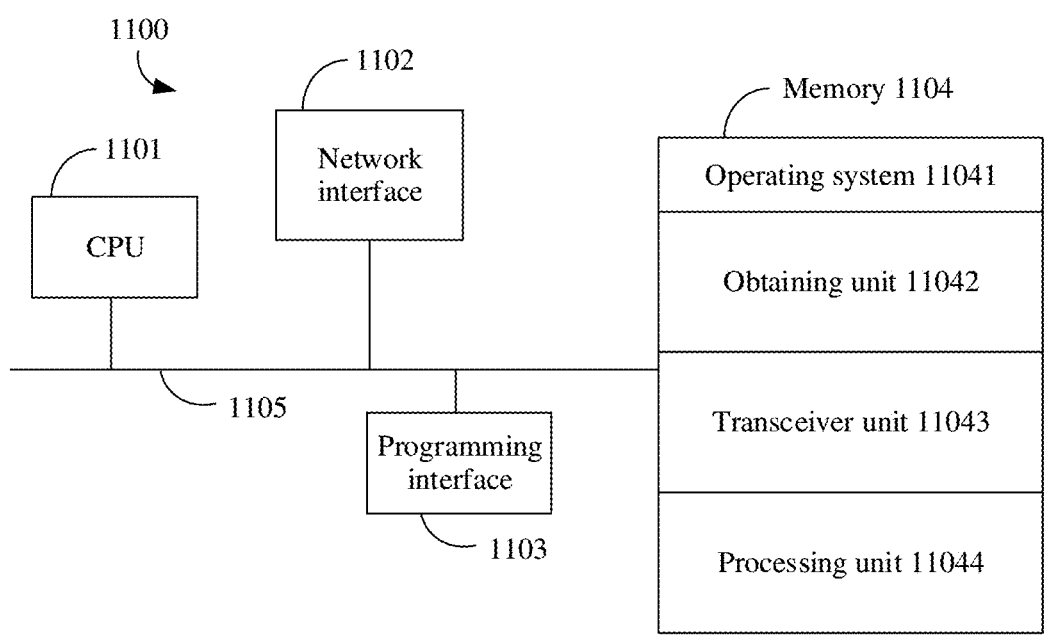
FIG. 11 is a schematic diagram of a structure of a network device 1100 according to an embodiment of this application.

To implement the foregoing embodiments, this application further provides a network device 1100. FIG. 11 is a schematic diagram of a structure of a network device 1100 according to an embodiment of this application.

Although the network device 1100 shown in FIG. 11 shows some specific features, a person skilled in the art may be aware from the embodiments of this application that, for brevity, FIG. 11 does not show various other features, to avoid confusing more related aspects of the implementations disclosed in the embodiments of this application. Therefore, in a restrictive example, in some implementations, the network device 1100 includes an obtaining unit 11042, a transceiver unit 11043, and a processing unit 11044. These units may be implemented in a form of software, or may be implemented in a form of hardware. In some implementations, if the obtaining unit 11042, the transceiver unit 11043, and the processing unit 11044 are implemented by using software, the network device 1100 further includes one or more processors (for example, a central processing unit (CPU)) 1101, a network interface 1102, a programming interface 1103, a memory 1104, and one or more communications buses 1105. The communications bus 1105 is configured to interconnect various components.

In some implementations, in addition to another purpose, the network interface 1102 is configured to connect to one or more other network devices in a network system. In some implementations, the communications bus 1105 includes a circuit that interconnects and controls communication between system components. The memory 1104 may include a nonvolatile memory, for example, a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The memory 1104 may also include a volatile memory. The volatile memory may be a random access memory (RAM), and is used as an external cache.

In some implementations, the memory 1104 or a non-transitory computer-readable storage medium of the memory 1104 stores the following programs, modules, and data structures, or a subset thereof, and specifically includes an operating system 11041, the obtaining unit 11042, the transceiver unit 11043, and the processing unit 11044.

The operating system 11041 is used to process various basic system services and a process used to perform a hardware-related task.

In various implementations, the obtaining unit 11042 is configured to obtain link fault information, for example, obtain first information indicating that the first link is faulty. In various implementations, the transceiver unit 11043 is configured to receive or send information and routing, for example, send the first information or receive second information. In various implementations, the processing unit 11044 is configured to perform a processing operation related to a routing table, for example, determining an unreachable route in the routing table, and deleting the unreachable route or marking the unreachable route in the routing table as invalid. In various implementations, the network device 1100 is configured to perform various methods provided in embodiments of this application, for example, perform the route processing method 200 shown in FIG. 2 or the network topology generation method 600 shown in FIG. 6.

The foregoing describes embodiments of this application in detail. Steps in the methods in embodiments of this application may be sequentially scheduled, combined, or deleted according to an actual requirement. Modules in the apparatus in embodiments of this application may be divided, combined, or deleted according to an actual requirement.

It should be understood that "one embodiment" or "an embodiment" mentioned in the entire specification does not mean that particular features, structures, or characteristics related to the embodiment are included in at least one embodiment of this application. Therefore, "in one embodiment" or "in an embodiment" appearing in the specification does not refer to a same embodiment. In addition, these particular features, structures, or characteristics may be combined in one or more embodiments in any proper manner. It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

The term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in embodiments of this application, "B corresponding to A" indicates that B is associated with A, and B may be determined based on A. However, it should be further understood that determining B based on A does not mean that B is determined based only on A. B may alternatively be determined based on A and/or other information.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatuses, and methods may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected according to actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a portable hard disk, a read-only memory, a random access memory, a magnetic disk, or an optical disc.

What is claimed is:

1. A method, comprising:
   obtaining, by a first network device, first information, wherein the first information indicates that a first link is faulty, and the first link is a link between network devices in a network system to which the first network device belongs;
   sending, by the first network device, the first information to a second network device, wherein the second network device is a first neighbor device of the first network device; and
   after sending the first information to the second network device, determining, by the first network device, an unreachable route in a routing table of the first network device based on the first information and a topology of the network system, wherein a path corresponding to the unreachable route comprises the first link, and determining, by the first network device, the unreachable route in the routing table of the first network device based on the first information and the topology of the network system comprises:
   when the first network device is not an end device of the first link, determining, by the first network device based on the first information, information about a second neighbor device of the first network device that sends the first information, and the topology of the network system, an unreachable network device of the second neighbor device that sends the first information, and determining that a route that is generated by the unreachable network device and received by the first neighbor device is the unreachable route.

2. The method according to claim 1, further comprising:
   receiving, by the first network device, second information, wherein the second information comprises an identifier of a third network device and information about a link between the third network device and a neighbor device of the third network device, and the third network device is a network device other than the first network device in the network system;
   forwarding, by the first network device, the second information to the first neighbor device of the first network device or to a further neighbor device of the first network device; and
   generating, by the first network device, the topology of the network system based on the second information.

3. The method according to claim 2, wherein the identifier of the third network device comprises a loopback interface address of the third network device, and the information about the link between the third network device and the neighbor device of the third network device comprises an interface address of the third network device and an interface address of the neighbor device of the third network device.

4. The method according to claim 1, wherein determining, by the first network device, the unreachable route in the routing table of the first network device based on the first information and the topology of the network system comprises:
   when the first network device is a first end device of the first link, determining, by the first network device, that a route that comprises the first link and that is advertised by a second end device of the first link is the unreachable route.

5. The method according to claim 4, wherein after determining, by the first network device, that the route that comprises the first link and that is advertised by the second end device of the first link is the unreachable route, the method further comprises:
   sending, by the first network device, third information to the second network device, wherein the third information indicates to the second network device to withdraw the route that comprises the first link and that is advertised by the second end device of the first link.

6. The method according to claim 1, wherein obtaining, by the first network device, the first information comprises:
   obtaining, by the first network device, the first information by detecting a status of the first link or a status of an interface corresponding to the first link.

7. The method according to claim 1, wherein obtaining, by the first network device, the first information comprises:
   receiving, by the first network device, the first information from a fourth network device, wherein the fourth network device is a further neighbor device of the first network device.

8. The method according to claim 7, further comprising:
   receiving, by the first network device, fourth information from the fourth network device, wherein the fourth information indicates to the first network device to withdraw a route advertised by an end device of the first link; and
   deleting, by the first network device, the unreachable route from the routing table based on the fourth information.

9. The method according to claim 1, wherein:
sending, by the first network device, the first information to the second network device comprises:
sending, by the first network device, the first information to the second network device by using an extended border gateway protocol (BGP); and
the method further comprises:
deleting, by the first network device, the unreachable route or marking the unreachable route as invalid.

10. A network device, wherein the network device is configured to act as a first network device, and the network device comprises:
at least one processor; and
a non-transitory computer readable storage medium storing a program that is executable by the at least one processor, the program including instructions to:
obtain first information, wherein the first information indicates that a first link is faulty, and the first link is a link between network devices in a network system to which the first network device belongs;
send the first information to a second network device, wherein the second network device is a first neighbor device of the first network device;
after sending the first information to the second network device, determine an unreachable route in a routing table of the first network device based on the first information and a topology of the network system, wherein a path corresponding to the unreachable route comprises the first link; and
when the first network device is not an end device of the first link, determine, based on the first information, information about a second neighbor device of the first network device that sends the first information, and the topology of the network system, an unreachable network device of the second neighbor device, and determine that a route that is generated by the unreachable network device and received by the first neighbor device is the unreachable route.

11. The network device according to claim 10, wherein the program further includes instructions to:
receive second information, wherein the second information comprises an identifier of a third network device and information about a link between the third network device and a neighbor device of the third network device, and the third network device is a network device other than the first network device in the network system;
forward the second information to the second network device by using a border gateway protocol (BGP); and
generate the topology of the network system based on the second information.

12. The network device according to claim 11, wherein the identifier of the third network device comprises a loopback interface address of the third network device, and the information about the link between the third network device and the neighbor device of the third network device comprises an interface address of the third network device and an interface address of the neighbor device of the third network device.

13. The network device according to claim 10, wherein the program further includes instructions to:
when the first network device is a first end device of the first link, determine that a route that comprises the first link and that is advertised by a second end device of the first link is the unreachable route.

14. The network device according to claim 10, wherein the program further includes instructions to:
send third information to the first neighbor device of the first network device or to a further neighbor device of the first network device, wherein the third information indicates to the first neighbor device of the first network device or to the further neighbor device of the first network device to withdraw a route that comprises the first link and that is advertised by a second end device of the first link.

15. The network device according to claim 10, wherein the program further includes instructions to:
obtain the first information by detecting a status of the first link or a status of an interface corresponding to the first link.

16. The network device according to claim 10, wherein the program further includes instructions to:
obtain the first information from a fourth network device, wherein the fourth network device is a further neighbor device of the first network device.

17. The network device according to claim 16, wherein the program further includes instructions to:
receive fourth information from the fourth network device, wherein the fourth information indicates to the first network device to withdraw a route advertised by an end device of the first link; and
delete the unreachable route from the routing table based on the fourth information.

18. The network device according to claim 10, wherein the program further includes instructions to:
send the first information to the second network device by using an extended border gateway protocol (BGP); and
delete the unreachable route or mark the unreachable route as invalid.

19. A non-transitory computer readable storage medium with instructions stored thereon, wherein the instructions, when executed by at least one processor, enable the at least one processor to:
obtain first information, wherein the first information indicates that a first link is faulty, and the first link is a link between network devices in a network system to which a first network device belongs;
send the first information to a second network device, wherein the second network device is a first neighbor device of the first network device;
after sending the first information to the second network device, determine an unreachable route in a routing table of the first network device based on the first information and a topology of the network system, wherein a path corresponding to the unreachable route comprises the first link; and
when the first network device is not an end device of the first link, determine, based on the first information, information about a second neighbor device of the first network device that sends the first information, and the topology of the network system, an unreachable network device of the second neighbor device, and determine that a route that is generated by the unreachable network device and received by the first neighbor device is the unreachable route.

20. The non-transitory computer readable storage medium of claim 19, wherein the instructions, when executed by at least one processor, further enable the at least one processor to:
when the first network device is a first end device of the first link, determine that a route that comprises the first link and that is advertised by a second end device of the first link is the unreachable route.

* * * * *